(12) United States Patent
Demoulin et al.

(10) Patent No.: US 7,639,752 B2
(45) Date of Patent: Dec. 29, 2009

(54) PROCESS FOR SELECTING A TRANSMISSION CHANNEL AND RECEIVER OF SIGNALS WITH ANTENNA DIVERSITY

(75) Inventors: Vincent Demoulin, Pleumeleuc (FR); Jean-François Kerjean, Le Conquet (FR)

(73) Assignee: Thomson Licensing, Boulogne, Billancourt (FR)

( * ) Notice: Subject to any disclaimer, the term of this patent is extended or adjusted under 35 U.S.C. 154(b) by 507 days.

(21) Appl. No.: 10/656,074

(22) Filed: Sep. 5, 2003

(65) Prior Publication Data

US 2004/0125741 A1     Jul. 1, 2004

(51) Int. Cl.
    H04B 7/02    (2006.01)
    H04B 7/10    (2006.01)

(52) U.S. Cl. .................... 375/267; 375/347

(58) Field of Classification Search ........ 375/228, 375/150, 340, 260, 267, 347; 398/27; 455/277.2; 370/347, 208, 210
See application file for complete search history.

(56) References Cited

U.S. PATENT DOCUMENTS

| | | | | |
|---|---|---|---|---|
| 4,885,757 A * | 12/1989 | Provence | ...................... | 375/343 |
| 5,144,642 A * | 9/1992 | Weinberg et al. | ............ | 375/228 |
| 5,432,778 A * | 7/1995 | Minde et al. | ................. | 370/347 |
| 5,740,526 A * | 4/1998 | Bonta et al. | ............... | 455/277.2 |
| 5,764,858 A * | 6/1998 | Sheu et al. | ..................... | 706/26 |
| 6,965,736 B1 * | 11/2005 | Hanik et al. | ................... | 398/27 |
| 7,099,380 B1 * | 8/2006 | Feng et al. | .................... | 375/150 |
| 2003/0053412 A1 * | 3/2003 | Yoshida et al. | ............... | 370/208 |

FOREIGN PATENT DOCUMENTS

| | | |
|---|---|---|
| EP | 0600547 | 6/1994 |
| EP | 1041736 | 10/2000 |
| EP | 1065804 | 1/2001 |
| EP | 1231722 | 8/2002 |
| JP | 2001156738 A | 6/2001 |
| WO | 0193454 A2 | 12/2001 |

OTHER PUBLICATIONS

Lippmann, R.; "An Introduction to Computing with Neural Nets"; IEEE ASSP Magazine; Apr. 1987; pp. 4-22.*
M. Naumovski, R. Carrasco, "Neural Network Beamformer for Narrow-band HF Transmission", Nov. 14, 1995, London UK, Pg. 5/1 - 5/8, IEEE Publication.
China Science Patent and Trademark Agent LTD Correspondence dated Jun. 26, 2008 Citing Refs 1-3.

* cited by examiner

*Primary Examiner*—Don N Vo
(74) *Attorney, Agent, or Firm*—Robert D. Shedd; Vincent E. Duffy; Michael A. Pugel

(57) ABSTRACT

A process for selecting a transmission channel from several transmission channels of a receiver of Orthogonal Frequency Division Multiplexing (OFDM) radio signals with antenna diversity, with a view to favoring the transmission channel delivering a signal with the lowest binary error rate, consists in estimating the binary error rate for each transmission channel by feeding a neural network with data Radio Frequency Channel (RFC) representative of the frequency response of the transmission channel.

5 Claims, 1 Drawing Sheet

Figure 1:
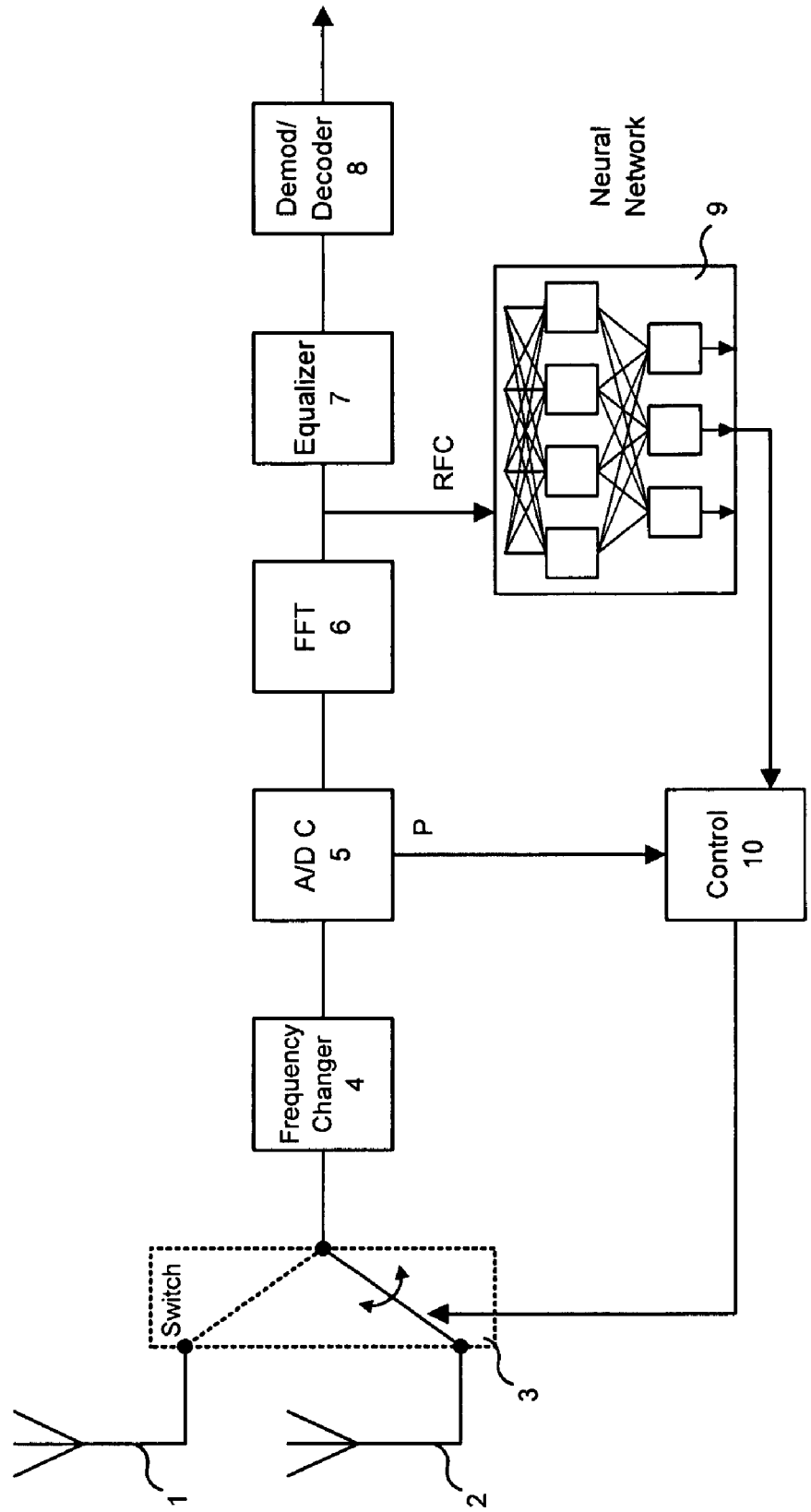

PROCESS FOR SELECTING A TRANSMISSION CHANNEL AND RECEIVER OF SIGNALS WITH ANTENNA DIVERSITY

BACKGROUND OF THE INVENTION

1. Field of the Invention

The invention relates to wireless digital communication systems with antenna diversity using OFDM (standing for Orthogonal Frequency Division Multiplex) type modulation. The antenna diversity helps to improve the quality of the transmission link in terms of reliability and robustness. Such communication systems are used for example in local wireless networks of the IEEE 802.11a or Hiperlan2 type which use burst transmission.

2. Description of the Prior Art

To find out more about transmissions using modulation of OFDM type, the person skilled in the art can consult: Allard M. et LASSALLE R., "Principes de modulation et de codage canal en radiodiffusion numérique vers des mobiles." [Principles of modulation and channel coding in digital radio broadcasting to mobiles], UER-Technique journal, No. 224, Aug. 1987, pp. 168-190; M.C.D. Maddocks, "An introduction to digital modulation and OFDM techniques", BBC Research and Development Report, BBC RD 1993/10; Le Floch B., Alard M. and Berrou C., "Coded Orthogonal Frequency Division Multiplex", Proceedings of the IEEE, vol. 83, No. 6, Jun. 1995, pp. 982-996. More particularly, the invention pertains to a process for selecting an antenna from several antennas available at the input of an OFDM radio signals receiver with antenna diversity, with a view to favouring the transmission channel delivering a signal leading to the lowest binary error rate after decoding.

To calculate the binary error rate on a transmission channel, one generally makes use of a certain number of bits of the preamble of each frame dispatched in the radio signal which is transmitted by the channel. However, this calculation is expensive in terms of time because it is necessary to decode a large number of bits and it is not suited to an antenna diversity receiver having to undergo temporally frequent changes of reception antenna.

SUMMARY OF THE INVENTION

The aim of the invention is to propose a process better suited to the selecting of a reception antenna of an antenna diversity receiver.

For this purpose, according to the invention, the process consists in estimating the binary error rate for each transmission channel by feeding a neural network with data representative of the frequency response of the transmission channel. Data representative of the frequency response of a transmission channel may be provided by a module for calculating the fast Fourier transform, which module already exists in the signal processing chain of an OFDM signals receiver. The Fourier transform calculation module is furnished with means which make it possible to calculate the frequency response of the channel over a sequence corresponding to the preamble. On receipt of the preamble of a frame in the radio signal, this module for calculating the fast Fourier transform calculates the frequency response of the transmission channel and this response is used by the equalizer to calculate the initial value of each of its equalization coefficients. On the basis of the frequency response of the transmission channel and of the power level of the signal received on the input, the neural network can estimate the binary error rate corresponding to a transmission channel.

To favour a simple structure for the neural network and in particular a structure based on the multilayer perceptron model, the neural network has undergone learning to evaluate, on the basis of the data representative of the response of the transmission channel, the power level of the signal on the input which would be necessary to obtain a predetermined binary error rate, for example a standard error rate of $10^{-4}$, and the output of the neural network is used with data representative of the actual power level of the signal received on the input so as to evaluate the binary error rate for this transmission channel.

The invention extends to an antenna diversity receiver for the implementation of the above process.

BRIEF DESCRIPTION OF THE SOLE FIGURE

The process according to the invention is illustrated in the single FIGURE showing a signal processing chain of an OFDM signals receiver with antenna diversity.

DESCRIPTION OF A PREFERRED EMBODIMENT

In the FIGURE, the receiver comprises by way of nonlimiting example two transmission channels 1 and 2, each consisting of an antenna. The said channels are connected via a switch 3 to the input of the signal processing chain of the receiver.

The signal processing chain of the receiver comprises in a conventional manner in this order, a frequency changer 4 which lowers the frequency of the input radio signal, an analogue/digital converter 5 in which the power level P of the signal received is among other things evaluated, a fast Fourier transform calculation module 6, an equalizer 7 and a demodulator/decoder 8.

The input radio signal transports bits organized into packets, each packet commencing with a defined preamble. In the module 6, the bits of the preamble of each packet are used to calculate the frequency response of the RFC transmission channel, these RFC data then being used in the equalizer 7 for the calculation of the initial equalization coefficients.

The RFC data representative of the frequency response of a transmission channel are also diverted to a neural network 9 which serves to evaluate the binary error rate for the selected transmission channel. On the basis of an evaluation of the binary error rate for each transmission channel 1 and 2, the shifting of the switch 3 is controlled automatically so as to favour the transmission channel leading to a decoded signal with the lowest binary error rate.

The RFC data are normalized in terms of power. This is why the result obtained with the neural network 9 indicates the power necessary in order to obtain a given error rate.

Represented in the FIGURE is a block 10 which controls the shifting of the switch 3. This block receives the power level P of the signal received at the input of the receiver and the output of the neural network 9 which is a neural network constructed according to the multilayer perceptron model. This model is known for its simplicity of implementation in microcircuits and also because the learning algorithms which it uses, of the error back-propagation type, are well known.

The neural network 9 has undergone learning to evaluate, on the basis of the RFC data representative of the response of a transmission channel, the power level of the signal on the transmission channel which would be necessary to obtain a predetermined binary error rate at the output of the demodulator/decoder 8, for example an error rate of $10^{-4}$. The database used for the learning of the neural network contains a set of channel responses normalized in terms of power and for each of them, the signal power necessary at the input of the receiver (at the antenna level) to obtain a binary error rate of $10^{-4}$ at the output of a Viterbi decoder matched to the rate of the code used on the transmitted signal. This "necessary power" represents the sensitivity of the receiver. Each element of the base can be obtained by simulation or by measurement. Simulation has the advantage of leading to reliable and accurate results but demands enormous calculation times. Measurement makes it possible to obtain a very large number of elements very rapidly but it must be done with particular care in order for these results to be reliable and moreover, the accuracy of the result obtained is limited. To guarantee a sufficient level of learning, the number of elements contained in the database must be at least a few hundred. Additionally, these elements must be distributed as uniformly as possible at the sensitivity level. By way of example, a single-antenna receiver coupled with a spatial positioner and a software tool making it possible to automate the measurements have been used to produce the data base. In order to guarantee the stability of the transmission channel so as to obtain the most reliable results possible, the measurements are conducted at night in an environment devoid of any human activity.

On the basis of the output of the neural network 9, that is to say an estimated necessary signal power level, and of the actual power level P of the signal received at the antenna level, an estimation of the binary error rate for the transmission channel can be made using a calculation algorithm in the block 10. When it has estimated the binary error rate for the two transmission channels, the block 10 can control the switch 1 in such a way as to connect the input of the signal processing chain of the receiver to the antenna delivering an OFDM signal having the smallest estimated error rate.

More simply, it is also possible to compare the necessary power estimated by the neural network with the power received so as to obtain for each antenna and hence for each transmission channel a safety margin. The choice of antenna is made on the basis of the greatest safety margin.

Other variant embodiments are possible. By way of example, it is possible to use data representative of the frequency response of the transmission channel other than the RFC data. The equalization coefficients of the equalizer may for example be used but this is more expensive to implement.

It is also possible to integrate a data item representative of the input power into the neural network. In this case, the neural network provides the information choice of channel regarding directly. However, it is preferable to use only similar data in the neural network so as to simplify the learning.

The invention claimed is:

1. A method for selecting a transmission channel from several transmission channels of a receiver of orthogonal frequency division multiplexing radio signals with antenna diversity, with a view to favouring the transmission channel delivering a signal with the lowest binary error rate, the method comprising: estimating the binary error rate for each transmission channel by feeding a neural network with data representative of a frequency response of the transmission channel and selecting an antenna based on the output of the neural network.

2. The method according to claim 1, in which the data representative of a frequency response of the transmission channel are diverted in the receiver at the output of a module for calculating a fast fourier transform.

3. The method according to claim 1, in which the neural network has undergone learning to evaluate, on the basis of the data representative of a response of the transmission channel, a power level of the signal on the transmission channel which would be necessary to obtain a predetermined binary error rate and in which the output of the neural network is processed with data representative of an actual power level of the signal on the transmission channel so as to evaluate a binary error rate for the transmission channel.

4. The method according claim 1, in which the model of the neural network is a multilayer perceptron.

5. A receiver of orthogonal frequency division multiplexing signals with antenna diversity for implementing a method for selecting a transmission channel, comprising:
   a plurality of antennas;
   an orthogonal frequency division multiplexing signal processing chain coupled to the plurality of antennas; and
   a switch shifted so as to connect the input of a signal processing chain to the antenna which provides a signal exhibiting the lowest binary error rate, the shifting of the switch being controlled on the basis of an information produced at the output of a neural network connected to estimating means providing data representative of the frequency response of the transmission channel.

* * * * *

UNITED STATES PATENT AND TRADEMARK OFFICE
CERTIFICATE OF CORRECTION

PATENT NO. : 7,639,752 B2 Page 1 of 1
APPLICATION NO. : 10/656074
DATED : December 29, 2009
INVENTOR(S) : Demoulin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 954 days.

Signed and Sealed this

Ninth Day of November, 2010

David J. Kappos
*Director of the United States Patent and Trademark Office*